T. G. ALLEN.
BRAKE FOR THE STEERING WHEELS OF VEHICLES.
APPLICATION FILED NOV. 30, 1908.
932,234.
Patented Aug. 24, 1909.
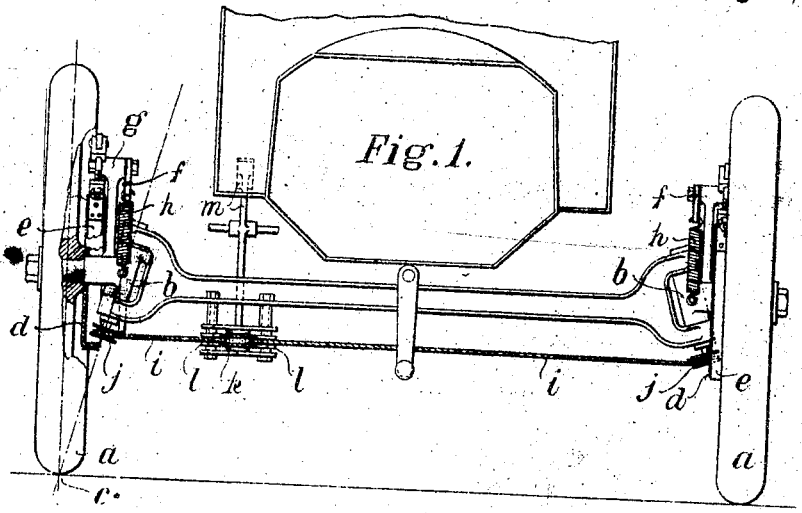
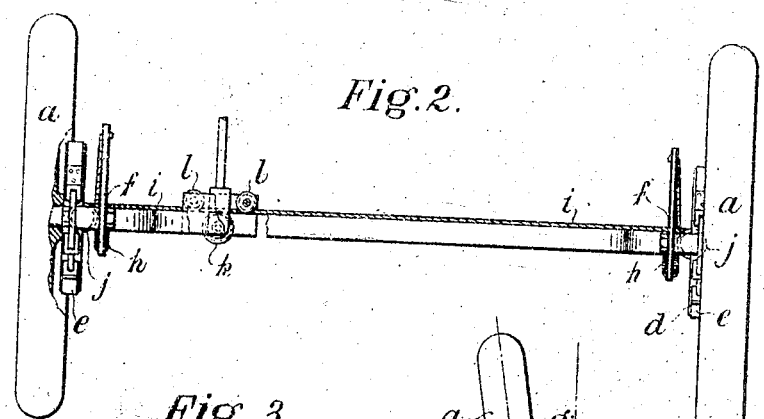
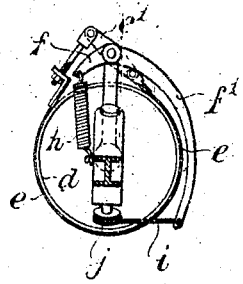
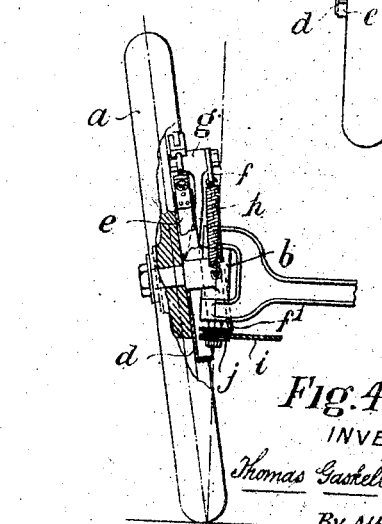
WITNESSES:
INVENTOR:
Thomas Gaskell Allen,
By Attorneys,

UNITED STATES PATENT OFFICE.

THOMAS GASKELL ALLEN, OF LONDON, ENGLAND.

BRAKE FOR THE STEERING-WHEELS OF VEHICLES.

932,234.

Specification of Letters Patent.

Patented Aug. 24, 1909.

Application filed November 20, 1908. Serial No. 463,603.

*To all whom it may concern:*

Be it known that I, THOMAS GASKELL ALLEN, a citizen of the United States of America, residing at 106 Victoria street, London, England, have invented certain new and useful Improvements in Brakes for the Steering-Wheels of Vehicles, of which the following is a specification.

This invention relates to the braking of the steering wheels of road vehicles.

The present invention consists of the combination of a brake attached to each steering wheel, a flexible compensating connection between the brakes and the brake-operating mechanism which will permit the steering wheels to be operated for steering without affecting the utility of the brakes should they be in operation at the time when the steering movements take place, and a wheel and stud axle therefor so designed as to bring the point of contact of the wheel with the ground approximately in line with the center of the steering pivot of the stud axle. There may further be included in the combination a special arrangement of pulleys for the flexible compensating mechanism together with an arrangement of brake levers which will allow the leverage necessary for braking being obtained at the termination of the compensating gear instead of at the operating lever thereof, thereby minimizing the strain on the compensating mechanism and reducing to a minimum the wear and tear of the flexible members.

The accompanying drawings illustrate the invention applied to two forms of wheel axles, in both of which the point of contact of the wheel with the road is in line with the steering axis about which the wheel turns for the steering movement. It may here be mentioned that this arrangement of the steering axis has been hitherto employed in connection with the steering wheels for the purpose of preventing a reaction on the steering mechanism by the roughness of the road. In the present case however this arrangement of the wheel and the steering axle is employed for the purpose of preventing any unevenness of friction resulting from the application of the brakes from affecting the steering.

Figure 1 is a front elevation of the front wheels of a motor car showing the invention applied thereto; Fig. 2 is a plan of Fig. 1; Fig. 3 is a detail; and Fig. 4 is a part similar view to Fig. 1 of a modified construction.

Referring to Figs. 1 to 3, $a\ a$ are the steering wheels mounted upon stud axles $b\ b$ which it will be seen are so inclined that the vertical axis of the steering axles shown by the dotted lines in Fig. 1 coincide with the point of contact between the wheels and the ground as at $c$. $d\ d$ are brake drums upon the wheels having the usual brake band $e$ thereon, the ends of the brake band $e$ are connected to the respective ends of the lever $e'$ so as to be operated by the brake lever $f$ which is centered on the bracket $g$ and is kept in the off position by a spring $h$. The operating arm $f'$ of the lever $f$ is made long and extends downward to the underside of the wheel axle and brake drum where it is connected to the rope or wire $i$ which forms the flexible compensating brake mechanism. This rope extends from the brake lever $f''$ on one wheel across to the corresponding lever on the opposite wheel and the compensating rope is passed over independently rotatable pulleys $j\ j$ mounted at the bottom of the stud axle in alinement with the axis thereof in such manner as not to affect or to be affected by the steering movement of the vehicle wheels $a$. The compensating rope is operated in the known way by a pulley $k$ disposed between two fixed pulleys $l\ l$ and adapted to be reciprocated by a foot lever $m$ and by suitable connecting mechanism.

In operation a depression of the foot lever $m$ causes the compensating rope to exert a pull upon the brake levers $f''$, and as these brake levers are of considerable length less power is required to be transmitted through the compensating rope than would be the case if brake levers of the ordinary length were employed, and consequently there is less liability to wear and tear or fraying of the rope which is generally made of wire cable. The long lever also permits of the pulleys $j\ j$ being placed on the underside of the stud axle pivots whereby the compensating rope and its operating mechanism can be conveniently disposed clear of the radiators and so forth which are generally carried on the front of the car. This arrangement also permits of the band brake being operated from the upper side of the brake drum which is the most convenient and effective position. When the brakes are applied the steering wheels can be operated in the usual way without affecting the operation of the brakes as the compensating rope merely runs longitudinally over the pulleys. These simultaneous braking and steering operations are further facilitated by the angular position of the stud axle pivot which brings the same in alinement with the point of contact between the steering wheels and the road.

Fig. 4 shows a modification wherein the stud axle is vertical and the wheel is sloped inward in order to bring the axle of the said stud axle in line with the point of contact between the wheel and the road. A similar effect can be obtained by inclining both the wheels and the stud axle pivots.

What I claim and desire to secure by Letters Patent is:—

1. In mechanism for braking the steering wheels of road vehicles, the combination of two steering wheels, stud axles therefor, each pivot of which is approximately in alinement with the point of contact between the wheel and the road, a brake on each steering wheel, levers connected with said brake on the upper side of the wheel axle and extending downward below the wheel axle, a flexible compensating connection between the two brake levers, and means for operating the brakes through said compensating connection.

2. In mechanism for braking the steering wheels of road vehicles, the combination of two steering wheels, stud axles therefor, each pivot of which is approximately in alinement with the point of contact between the wheel and the road, a band brake on each steering wheel, an elongated lever coupled to and operating the brake band on the upper side of the wheel axle and extending downward below the wheel axle, a flexible compensating connection between the two brake levers and means for operating the brakes through the compensating mechanism.

3. In mechanism for braking the steering wheels of road vehicles, the combination of two steering wheels, stud axles therefor, each pivot of which is approximately in alinement with the point of contact between the wheel and the road, a band brake on each steering wheel, an elongated lever coupled to and operating the brake band on the upper side of the wheel axle and extending downward below the wheel axle, pulleys mounted at the lower end of the stud axles with their pivots in alinement therewith, a flexible compensating connection passing over said pulleys and connecting the two brake levers together, and means for operating the brakes through the said flexible compensating connection.

4. In mechanism for braking the steering wheels of road vehicles, the combination of two steering wheels, stud axles therefor, each pivot of which is so inclined as to be approximately in alinement with the point of contact between the wheel and the road, a band brake on each steering wheel, an elongated lever coupled to and operating the brake band on the upper side of the wheel axle and extending downward below the wheel axle, a flexible compensating connection between the two brake levers and means for operating the brakes through the compensating mechanism.

5. In mechanism for braking the steering wheels of road vehicles, the combination of two steering wheels, stud axles therefor, each pivot of which is so inclined as to be approximately in alinement with the point of contact between the wheel and the road, a band brake on each steering wheel, an elongated lever coupled to and operating the brake band on the upper side of the wheel axle and extending downward below the wheel axle, pulleys mounted at the lower end of the stud axles with their axes in alinement therewith, a flexible compensating connection passing over said pulleys and connecting the two brake levers together, and means for operating the brakes through the said flexible compensating connection.

In witness whereof, I have hereunto signed my name in the presence of two subscribing witnesses.

THOMAS GASKELL ALLEN.

Witnesses:
ROBERT MILTON SPEARPOINT,
H. D. JAMESON.